R. BUCK.
AUTOMATIC HOG FEEDER.
APPLICATION FILED FEB. 7, 1921.

1,372,933.

Patented Mar. 29, 1921.
3 SHEETS—SHEET 1.

Inventor
R. Buck.
By C. A. Snow & Co.
Attorneys

R. BUCK.
AUTOMATIC HOG FEEDER.
APPLICATION FILED FEB. 7, 1921.

1,372,933.

Patented Mar. 29, 1921.
3 SHEETS—SHEET 2.

R. Buck
By C.A. Snow & Co.
Attorney

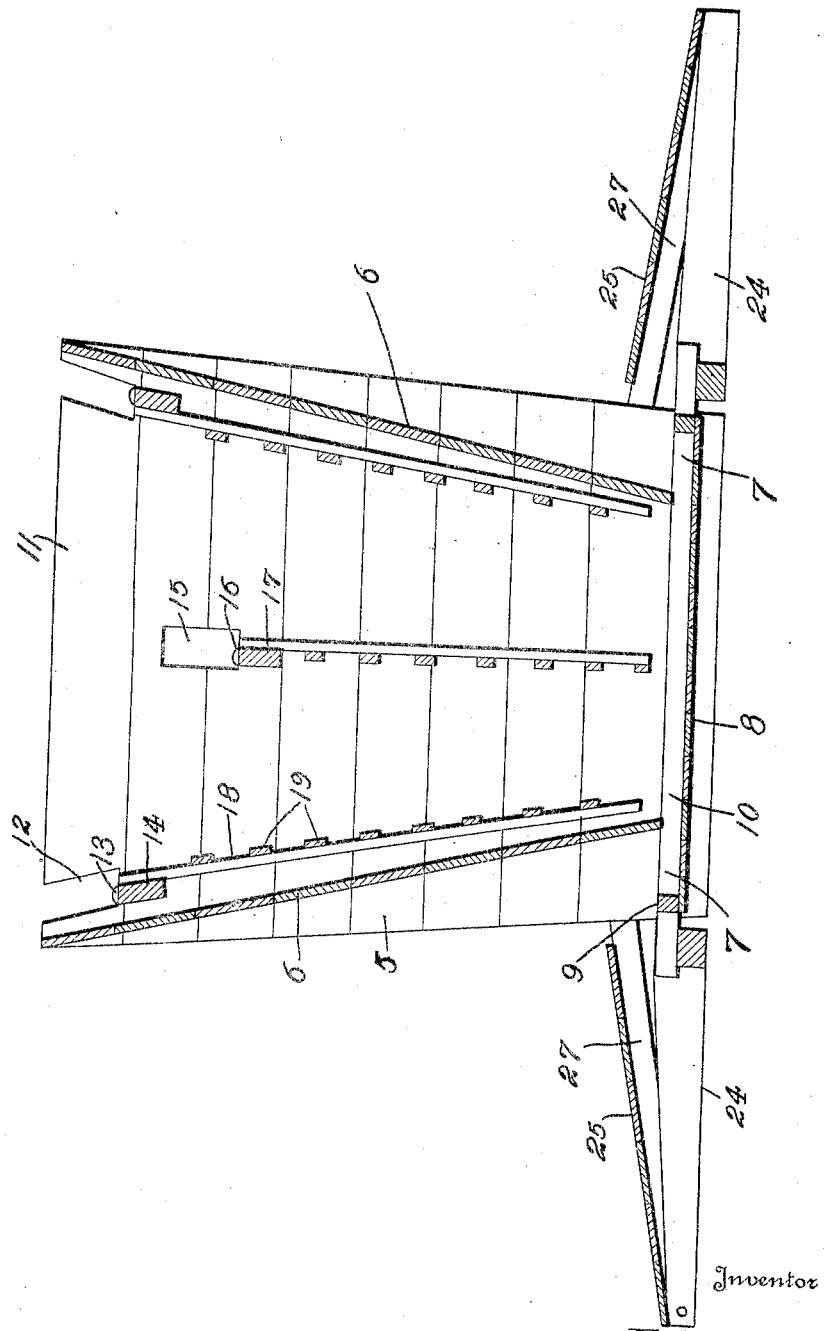

UNITED STATES PATENT OFFICE.

RALPH BUCK, OF ST. PARIS, OHIO.

AUTOMATIC HOG-FEEDER.

1,372,933.    Specification of Letters Patent.    Patented Mar. 29, 1921.

Application filed February 7, 1921. Serial No. 443,075.

*To all whom it may concern:*

Be it known that I, RALPH BUCK, a citizen of the United States, residing at St. Paris, in the county of Champaign and State of Ohio, have invented a new and useful Automatic Hog-Feeder, of which the following is a specification.

This invention relates to hog feeding troughs, and more particularly to a trough especially designed for feeding dry feed.

The primary object of the invention is to provide a trough of this character having a plurality of agitating members disposed therein, the agitating members operating to move the feed within the trough to cause the same to descend to the lower portion thereof.

A further object of the invention is the provision of platforms movable with respect to the trough, the platforms having connection with the agitating means, whereby the weight of the animals on the platforms will cause the operation of the agitating means.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Fig. 3 illustrates a transverse sectional view through the trough.

Figure 1:
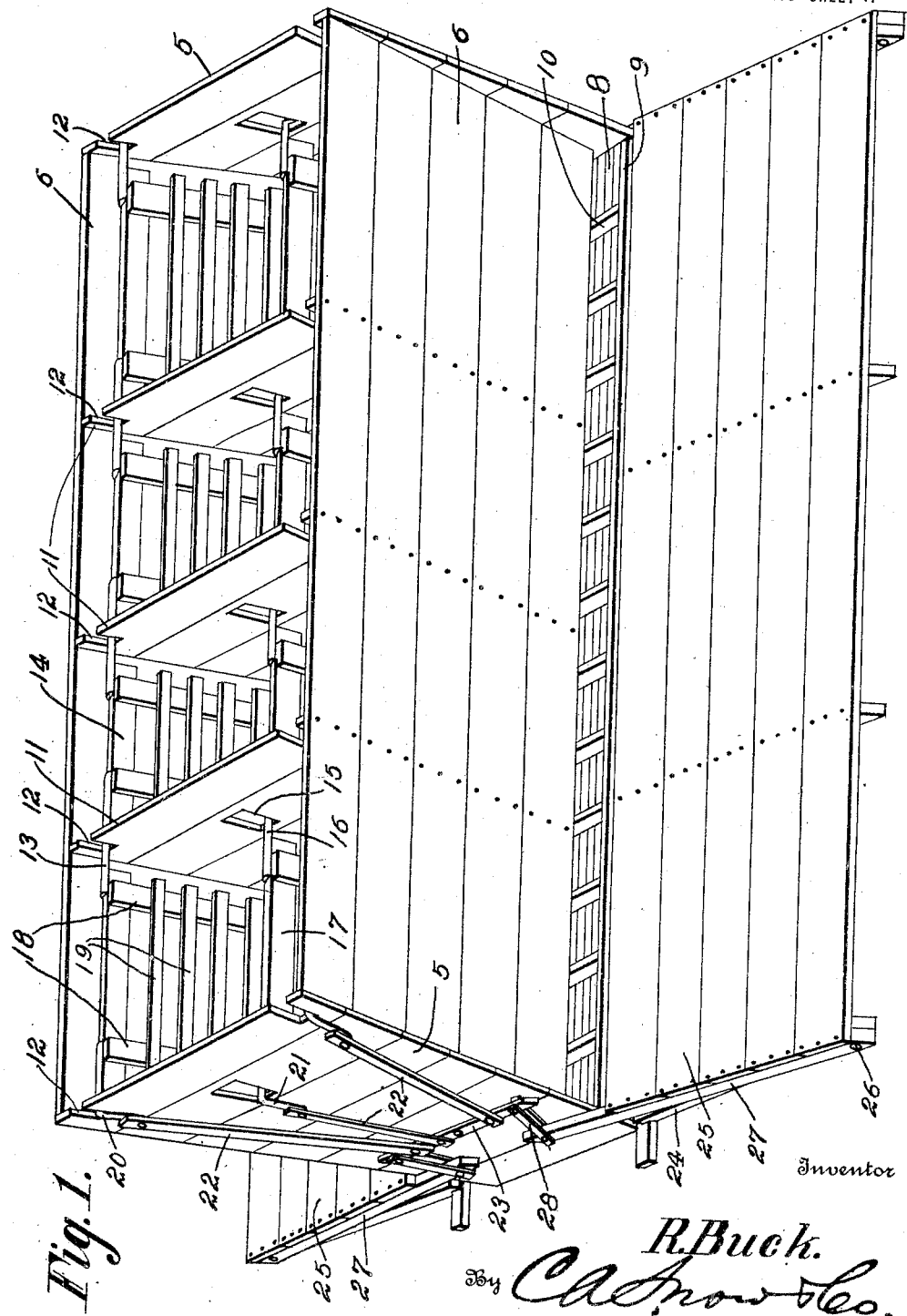
Figure 1 illustrates a perspective view of a trough constructed in accordance with the present invention.
Figure 2:
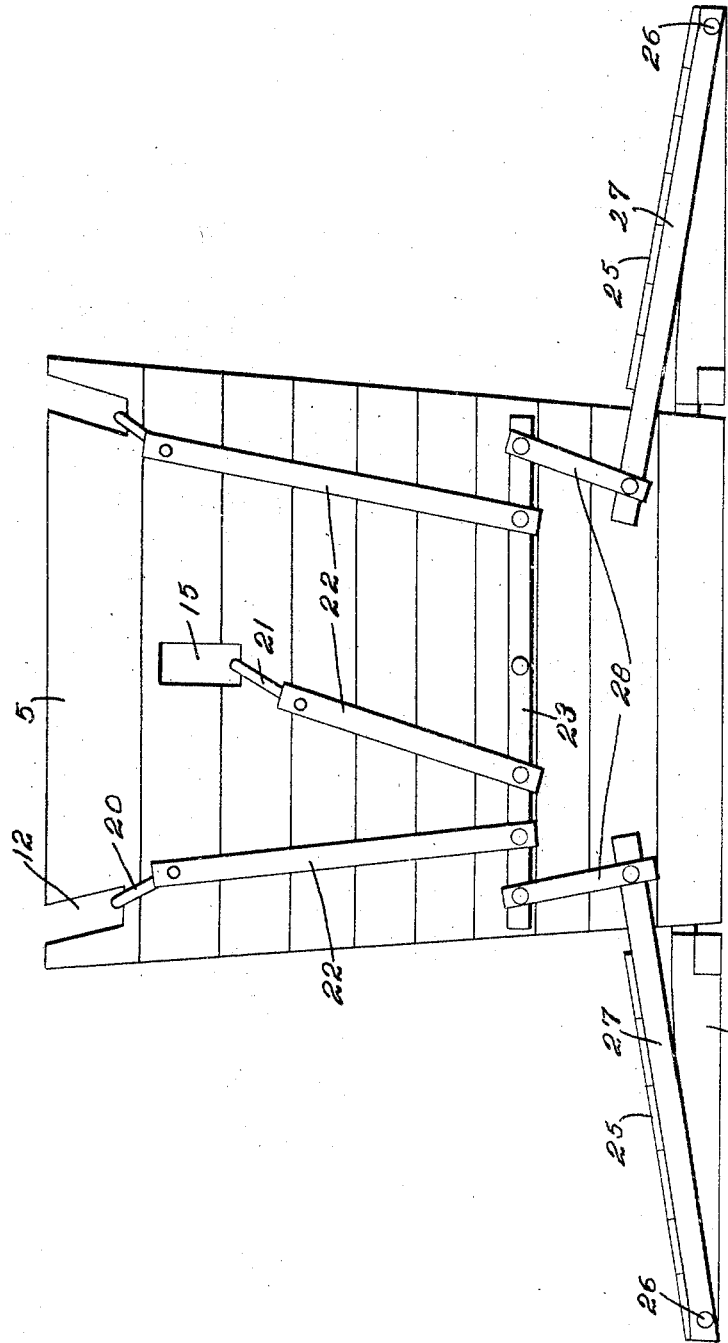
Fig. 2 illustrates an end elevational view.

Referring to the drawings in detail, the trough includes a hopper portion comprising the end walls 5 and side walls 6, the side walls being inclined toward the bottom of the hopper to provide a trough 7 at each side of the hopper providing places for the animals to feed.

The bottom of the hopper which is indicated at 8, is supported in spaced relation with the surface on which the device is positioned, so that moisture which may be present on the surface will not enter the hopper.

Bars 9 extend along the side edges of the bottom 8 and provide guards to prevent the material or feed within the troughs from being thrown therefrom, while an animal is eating, and in order that one animal will not interfere with the feeding of another animal, a plurality of transverse bars 10 are provided, which divide the troughs into individual feeding sections.

Positioned within the hopper and connecting the side walls thereof, are the partitioning members 11, which partition the hopper into a plurality of feed containing compartments, to cause the agitating means within the hopper and compartments to operate with efficiency.

Formed in the end walls of the hopper and the partitioning members 11 at points adjacent the upper ends thereof, are the notches 12 which notches provide seats for the arms 13 that connect the agitating frames 14, it being understood that a frame 14 is disposed in each compartment of the hopper and normally lies in parallel relation with the side walls thereof, so that when the agitating frames are operated, the same move toward the central portions of the compartments.

Openings 15 are provided in each of the end walls 5 of the hopper, and in each of the partitioning members, the openings being disposed at a point adjacent to the upper edges thereof, and intermediate the side edges thereof, and provide seats for the rods 16 that connect the central agitating frames 17, which normally lie in vertical positions within the compartments of the hopper.

Each of these agitating frames 14 and 17 includes end bars 18 which are connected by parallel spaced bars 19, which construction forms a comparatively light agitating means, and one which will readily respond to the movements of the platforms, under the weight of the animals standing thereon.

As before stated these agitating frames are connected by means of the arms 13 and rods 16. The rods 20 which have connection with the end frames have right angled portions 21 that have connection with the operating rods 22, the right angled portions 21 forming crank arms, by means of which movement of the operating rods 22 will impart a rocking motion to the agitating members to cause the same to move within their compartments.

The lower ends of the operating rods 22 have connection with the controlling rods 23 that are pivotally connected to the end walls of the hopper, at points intermediate their ends, the rods 22 being pivotally connected to the rods 23 at points adjacent the ends thereof to cause the rods 22 to move when the rods 23 are tilted.

Stationary frames 24 form a part of the feeder, and these frames provide supports for the movable platforms 25, which have their outer ends pivotally connected to the frames 24 as at 26, the side bars 27 of the platforms extending to points adjacent the end walls of the hopper, where the same have pivotal connection with the rods 23 as by means of the links 28.

These platforms, as clearly shown by Fig. 3 of the drawings are inclined so that when the front feet of an animal are positioned thereon, the weight of the animal will cause the platform to descend, bringing with it the end of the bar 23 to which the platform is connected, thereby imparting a rocking motion to the agitating members supported therein.

In the operation of the agitating means, the central agitating frames force the material toward the trough 7, so that the same may be easily reached by the animal being fed, while the agitating frames 14 force the feed toward the center of the hopper, where the same is picked up by the central agitating member.

Having thus described the invention, what is claimed as new is:—

1. In a feeder, a hopper including end walls and inclined side walls, a plurality of partitioning members within the hopper providing a plurality of feed compartments, said end walls and partitioning members having cut out portions disposed at the upper ends thereof, said end walls and partitioning members having central openings, agitating frames between the partitions and end walls, rods connecting adjacent agitating frames, said rods being disposed within the cut out portions, central agitating frames, rods for connecting adjacent central agitating frames, the latter rods being disposed within the central openings, pivoted platforms, and means for connecting the pivoted platforms to the rods to cause the agitating frames to pivot within the hopper.

2. In a feeder, a hopper including end walls and inclined side walls, partitioning members within the hopper for partitioning the same into a plurality of compartments, agitating frames disposed adjacent the side walls of the hopper, central agitating frames within the hopper, means for connecting the agitating frames, pivoted platforms associated with the hopper, and means for connecting the agitating frames and platforms whereby movement of the platforms causes a rocking movement of the agitating frames.

In testimony that I claim the foregoing as my own, I have hereto affixed my signature in the presence of two witnesses.

RALPH BUCK.

Witnesses:
S. A. JENKINS,
J. D. VAN CULIN.